United States Patent [19]
Jackson et al.

[11] Patent Number: 5,609,020
[45] Date of Patent: Mar. 11, 1997

[54] THRUST REVERSER SYNCHRONIZATION SHAFT LOCK

[75] Inventors: John Jackson, Renton; Mark J. Gucker, Kirkland, both of Wash.; Mark H. Smith, Birmingham, Ala.

[73] Assignee: The Boeing Company, Seattle, Wash.

[21] Appl. No.: 441,581

[22] Filed: May 15, 1995

[51] Int. Cl.$^6$ ............................................. F02K 3/02
[52] U.S. Cl. ........................... 60/226.2; 244/110 B; 91/41
[58] Field of Search .................................. 60/226.2, 230; 244/110 B; 239/265.27, 265.29, 265.33, 265.37; 91/41, 42, 44; 92/17, 20

[56] References Cited

U.S. PATENT DOCUMENTS

| | | |
|---|---|---|
| 2,722,298 | 11/1955 | Munschauer . |
| 3,621,763 | 11/1971 | Geyer . |
| 4,383,647 | 5/1983 | Woodruff et al. . |
| 4,391,409 | 7/1983 | Scholz ..................................... 60/226.2 |
| 4,543,783 | 10/1985 | Greüne et al. . |
| 4,567,965 | 2/1986 | Woodruff . |
| 4,586,329 | 5/1986 | Carlin . |
| 5,070,985 | 12/1991 | Davies et al. ......................... 244/110 B |
| 5,280,704 | 1/1994 | Anderson et al. ..................... 60/226.2 |
| 5,359,848 | 11/1994 | Davies .................................... 60/226.2 |
| 5,381,654 | 1/1995 | Halin ...................................... 60/226.2 |
| 5,448,884 | 9/1995 | Repp ....................................... 60/226.2 |

*Primary Examiner*—Timothy Thorpe
*Assistant Examiner*—Ted Kim
*Attorney, Agent, or Firm*—Christensen O'Connor Johnson & Kindness PLLC

[57] ABSTRACT

A thrust reverser synchronization shaft lock system that includes a sync lock control valve (50) and two hydraulically controlled sync locks (60) attached to the synchronization shafts (5) of a jet engine thrust reverser system, is disclosed. The thrust reverser system further comprises an isolation valve (45), a directional control valve (47), a plurality of actuators (19), and synchronization shafts (5). The sync locks (60) are capable via the synchronization shafts (5) of preventing the actuators (19) from deploying the thrust reversers of the jet engines. The sync locks (60) remain in a locked state until an independent control signal sent from the flight deck positively instructs the sync lock control valve (50) to unlock the sync locks (60), ensuring that the unlocking of the sync locks (60) corresponds to a valid thrust reverser deploy signal. The sync locks (60) each comprise a housing (65), a connection means to one of the synchronization shafts (5), a rotating jaw (75) for connection to one of the synchronization shafts (5), a sliding jaw (81), an unlock latch (106), a lock spring (87), and a manual release mechanism (99). Normally the lock spring (87) causes teeth on the sliding jaw (81) to engage teeth on the rotating jaw (75). Hydraulic pressure forces the sliding jaw (81) to move away from the rotating jaw (75) to unlock the sync locks 60.

15 Claims, 5 Drawing Sheets

THRUST REVERSER SYNCHRONIZATION SHAFT LOCK

FIELD OF THE INVENTION

The present invention relates to airplane thrust reversers, and more particularly to locking mechanisms for jet engine thrust reversers.

BACKGROUND OF THE INVENTION

Jet airplanes are built to operate at high speeds during flight. This results in relatively high speeds during landing. These speeds pose a challenge when trying to bring an airplane to a full stop after a landing, or during a refused takeoff. The plane's landing gear brakes and wing aerodynamic devices are the primary items used to slow the airplane. Assisting these items are thrust reversers that slow the airplane further by redirecting either engine exhaust gases or engine fan air in a nonrearward direction. Typically, thrust reverser operation is initiated by the pilot shortly after the airplane has touched down on the runway.

Thrust reversers come in a variety of designs depending on the engine manufacturer, the engine configuration, and the propulsion technology being utilized. Thrust reversers for turbofan engines are typically reversed in three ways. Cascade-type reversers, which redirect fan flow air through cascade vanes positioned on the periphery of the engine, are located at the engine's midsection. Cascade-type reversers are normally used on high bypass ratio engines. Target-type reversers, sometimes called clamshell reversers, utilize two doors to block the entire jet efflux. These doors are in the aft portion of the engine and form the rear part of the nacelle. Target reversers are typically used with low-bypass ratio engines. Pivot door reversers are similar to cascade-type reversers except that no cascade vanes are provided. Instead, four doors on the nacelle blossom outward to redirect flow.

As will be better understood from the following description, the present invention is a locking mechanism, specifically a thrust reverser synchronization shaft lock, that is ideally suited for use with hydraulically controlled cascade-type thrust reversers. While ideally suited for cascade-type reversers, it is to be understood that the present invention may be adapted for use with other thrust reverser systems that are hydraulically controlled and have a synchronization mechanism as a component of their thrust reverser systems.

A cascade-type thrust reverser works as follows. Thrust reverser sleeves (sometimes called translating cowls) are positioned circumferentially on the outside of the engine and cover cascade vanes (i.e., nonrearwardly facing air vents). The cascade vanes are positioned between the thrust reverser sleeves and the fan airflow path. A series of blocker doors mechanically linked to the thrust reverser sleeves are located in the fan airflow path. In their stowed position, the blocker doors are parallel to the fan airflow. In their deployed position, the blocker doors are transverse to the fan airflow path. When the thrust reversers are activated, the thrust reverser sleeves slide aft, causing the cascade vanes to be exposed and the blocker doors to move into their deployed position. This further causes the fan air to be redirected out the cascade vanes. The redirection of the fan air in a forward direction works to slow the airplane.

The thrust reverser sleeves are operated by one or more actuators per engine. The actuators are located on the fan case of the engine and interconnect with each other via a synchronization mechanism, such as a flexible shaft. The synchronization mechanism ensures that the actuators move at the same rate.

Thrust reversers are controlled by a hydraulic thrust reverser control system. Signals transmitted from the flight deck to the control system determine the desired state of the thrust reversers. The actuation system includes components that receive the signals and use them to regulate the pressure in various hydraulic fluid lines. Hydraulic pressure controls the position of the thrust reverser sleeves, guiding them between their deployed and stowed states. The hydraulic fluid lines may be hydraulically independent from the rest of the airplane, or may use hydraulic fluid that is a part of a larger airplane hydraulic system. The configuration of the latter, therefore, relying on supply and return lines from the overall airplane hydraulic system, as opposed to the former, which must include components to create internal supply and return lines. In either case, the supply line is designed to be at a higher pressure than the return line.

Typically, thrust reversers (hydraulic or otherwise) employ locking mechanisms to ensure that the thrust reversers are only activated at the proper time. Most locking mechanisms accomplish this by not allowing the actuators to deploy the thrust reverser sleeves unless a deploy command is initiated. In other words, these locking mechanisms only unlock the thrust reversers when a deploy command occurs.

Other locks simply operate to stop the internal and external forces acting on the thrust reversers from pushing the sleeves into their deployed state. One example is the lock described in U.S. Pat. No. 4,586,329 to Carlin. This patent describes a mechanical antirotation device to prevent uncommanded deployment of the thrust reversers due to gas loads within the engine and air loads external to the engine. The antirotation device is a mechanical lock attached to the synchronization shaft that interconnects mechanical jackscrews.

A feature of current locking mechanisms is that the actual locking elements tend to comprise a pin holding a toothed gear in a stationary position. The Carlin patent, discussed above, is a typical example of such a device where the engagement forces of the locking components are concentrated at a single pin pressed against a single abutment.

SUMMARY OF THE INVENTION

In accordance with the present invention, a hydraulic thrust reverser synchronization shaft lock system that requires a positive unlock command before allowing the thrust reversers to deploy is provided. When a command is initiated by the pilot to deploy thrust reversers, hydraulic fluid pressure is applied to actuators via isolation and directional control valves. The actuators, typically include a rod-and-piston arrangement, connecting the thrust reverser sleeves with a stationary portion of the engine. When hydraulic fluid pressure is applied to the appropriate chamber of the actuators, the rods are forced to extend or retract. Extension and retraction of the rods causes the connected sleeves to translate aft (i.e., deploy) or translate forward (i.e., stow). Synchronization between actuators is accomplished by a flexible synchronization shaft that is housed within a conduit or robe. The flexible shaft is in direct communication with the actuators and rotates whenever an actuator rod translates. In this way, all actuators are synchronized to retract and extend at the same time and at the same rate. The synchronization shaft lock system of the present invention comprises two sync locks and a sync lock control valve. Each sync lock is attached to a sync shaft conduit or tube and engages the flexible shaft. The sync locks are locked in their normal state, preventing the flexible shafts from rotating and thereby preventing thrust reverser deployment. The sync locks are unlocked by an independent control signal sent to the sync lock control valve from the flight deck or other control location. When a control signal is received by the sync lock control valve, the valve opens, applying hydraulic pressure to release the sync locks, allowing the flexible shaft to rotate. In this way the actuators are free to translate the thrust reverser sleeves. The sync locks and sync lock control valve are configured and placed in the thrust reverser actuation system so that, regardless of the internal pressures of the actuation system, the sync locks will not unlock unless directed to unlock by the sync lock control valve.

In accordance with further aspects of this invention, the sync lock control valve comprises one standard electrohydraulic solenoid valve. Preferably, the sync lock control valve is located remote from the sync locks.

In accordance with other aspects of this invention, each sync lock comprises a rotating jaw, a sliding jaw, a lock spring, a plurality of seals, an unlock-latch mechanism, various internal hydraulic chambers and passageways, and various hydraulic fluid ports. The rotating jaw is coupled to an end of the flexible shaft and the sliding jaw is pushed into engagement with the rotating jaw by pressure applied by the lock spring to a piston coupled to the sliding jaw. The sliding jaw is disengaged from the rotating jaw by the sync lock control valve applying hydraulic pressure to the side of the piston remote from the lock spring.

In accordance with still further aspects of this invention, the rotating jaw is supported by bearings.

In accordance with yet other aspects of this invention, to facilitate maintenance, each sync lock includes a manual release mechanism that allows the sync lock to be manually unlocked.

In further aspects of this invention, the sync locks include indicating means for locally and remotely alerting airline personnel as to the locked or unlocked state of the sync lock.

As will be readily appreciated from the foregoing description, the attachment of the sync locks to the flexible shafts means that only two sync locks are required per engine (for engines having a pair of transcowls). Further, only one standard electrohydraulic solenoid valve in the sync lock control valve is required to direct fluid pressure to unlock the sync locks on both transcowls. The standard electrohydraulic solenoid valve has been used in service for many years and represents a mature design with a significant spares pool. The fact that the sync lock control valve can be remotely located is an advantage because it means a smaller envelope is required in the nacelle area, typically space limited. Attaching the sync locks to the ends of the synchronization shaft means that the sync locks are easy to install, accessible during maintenance, and easy to retrofit to existing fleets.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
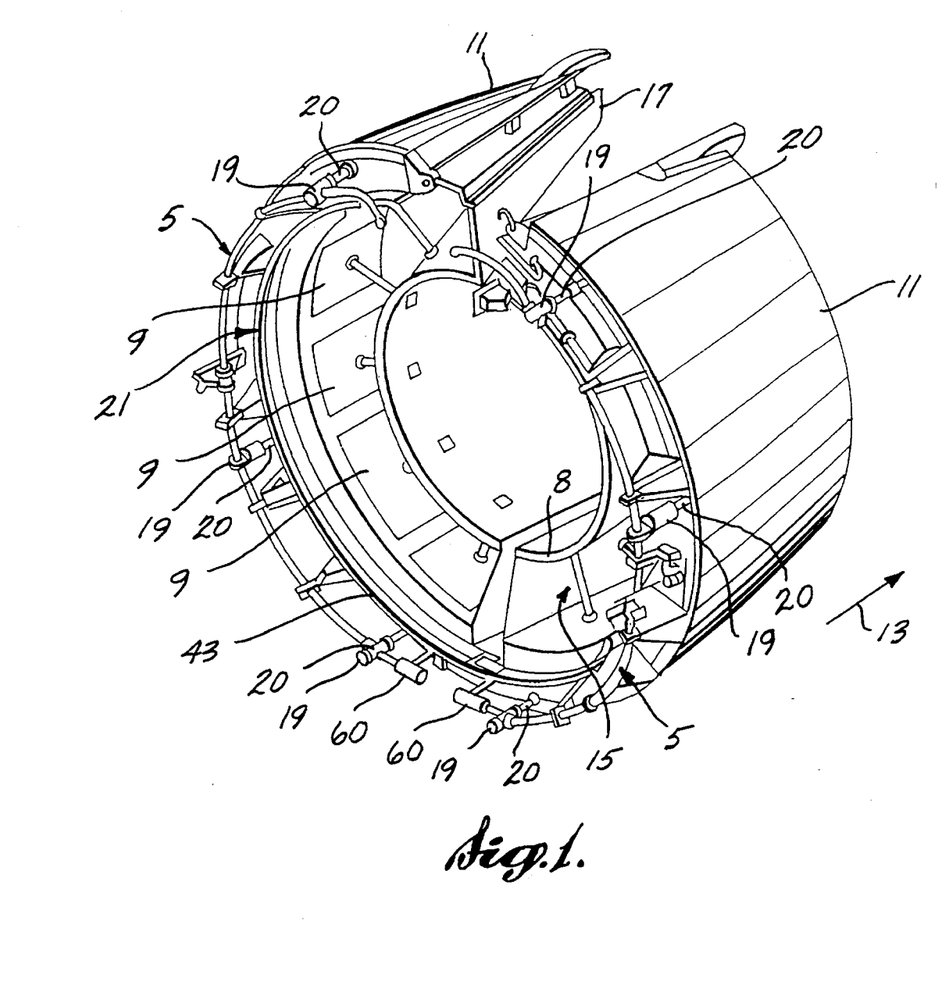
FIG. 1 is an isometric view of an exemplary thrust reverser in the stowed position with a sync lock formed in accordance with the present invention attached to a synchronization shaft.

Referring first to FIG. 1, there shown is an isometric view of an exemplary cascade-type thrust reverser in the stowed position. The thrust reverser includes a pair of outer thrust reverser sleeves 11, a core cowl 8, an annular duct 15, cascade vanes (not shown), a plurality of rotating blocker doors 9, a plurality of actuators 19, and a pair of synchronization shafts 5. The sleeves 11 are positioned circumferentially on the outside of the engine and together with the core cowl 8 form the annular duct 15 through which engine fan air flows. The sleeves 11 are guided in fore and aft directions along a pair of parallel tracks 17 affixed to the top and bottom vertical walls of the core cowl 8. Circumferentially inward of the sleeves 11, in the annular duct 15, are forward-facing cascade vanes mounted to a thrust reverser support structure 21. Inward of the cascade vanes are the blocker doors 9, which are connected to the sleeves 11 and which, in their stowed state, do not significantly disrupt airflow through the annular duct 15. In the preferred embodiment, each thrust reverser sleeve 11 is driven by one or more actuators 19—three per thrust reverser sleeve 11 are shown. The actuators 19 are located on the forward fixed structure of the thrust reverser. A synchronization system 5 interconnects the actuators 19.

Each actuator 19 is a typical hydraulic rod-and-seal-piston type actuator. An actuator rod 20 is located inside the aerodynamic surface of the sleeve 11 and is connected to the sleeve 11 by a ball joint (not shown). The ball joint is accessible by removing a panel (not shown) which is bolted to the exterior surface of the sleeve 11. Preferably, each actuator 19 is connected to a structural torque box via a gimbal mount, which allows the actuator to accommodate lateral variances in sleeve motion. An actuator piston (not shown) is connected to the actuator rod 20. Internal to the actuator 19 and located on opposite sides of the actuator piston, are a deploy compartment (not shown) and a stow compartment (not shown). Both compartments are capable of receiving hydraulic fluid pressure and of causing the actuator rod and piston to translate according to the relative force difference seen on each face of the piston from each of the two compartments. The actuator 19 also includes components (not shown) capable of connecting the actuator rod 20 to the flexible shaft 7 as described below. The actuators 19 are further described below with regard to their function in the thrust reverser control system.

The synchronization systems 5 are provided to ensure that the actuator rods 20 extend and retract the sleeves 11 at the same time and the same rate, to avoid causing the sleeves 11 to bind as the actuator rod 20 moves the sleeves 11 fore and aft. Each synchronization system 5 comprises a stationary outer conduit 6 and an internal rotating flexible shaft 7 (shown schematically in FIG. 2). Hydraulic fluid from the thrust reverser control system (shown in FIG. 2 and described below) fills the outer conduit 6 and surrounds the flexible shaft 7. Preferably, the flexible shaft 7 is connected to each actuator 19 via a worm and worm-wheel arrangement, and the conduit 6 is rigidly connected to the actuators 19 by a swivel coupling (not shown). When any one actuator rod 20 moves, the gear connection to the flexible shaft 7 causes the flexible shaft 7 to rotate, causing all the actuator rods 20 to move in unison. If the actuator rods 20 do not move in relative unison, due to one of the actuators being broken, for example, then the flexible shaft will not rotate. Thus, the flexible shaft controls synchronization of the movement of the actuators. The flexible shaft does not power the actuators. As described more fully below, hydraulic fluid pressure powers the actuators.

Figure 2:
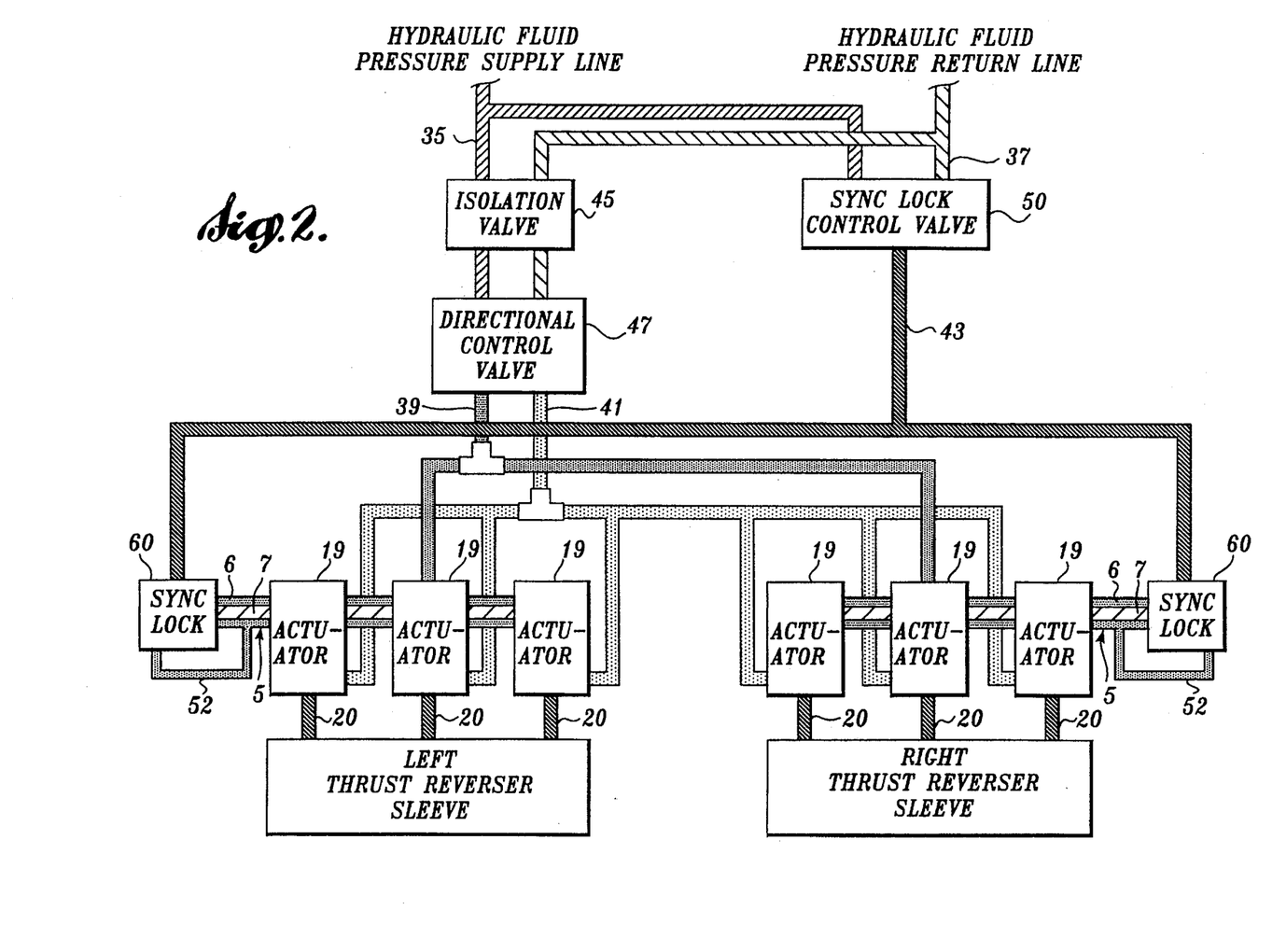
FIG. 2 is a system schematic of a typical hydraulic thrust reverser actuation and control system embodying a synchronization shaft lock system formed in accordance with the present invention.

The synchronization shaft lock system of the present invention comprises a sync lock control valve 50 (shown in FIG. 2) and two sync locks 60 (shown in FIGS. 1 and 2). The sync lock control valve 50 is coupled to both sync locks 60. As will be better understood from the following description, each sync lock 60 includes a housing 65, sliding jaw 81 and a rotating jaw 75 (shown in FIGS. 3 and 4). The housing is rigidly attached to the end of the outer conduit or tube 6 (shown in FIG. 1) and the rotating jaw 75 is attached to the end of the flexible shaft 7. Because there are two separate synchronization systems 5 per engine, a minimum of two sync locks 60 are required for each engine—one for each flexible shaft 7. When a sync lock 60 is locked, it prohibits the flexible shaft 7 from rotating, thereby prohibiting the actuator rods 20 and sleeves 11 from translating and the thrust reversers from deploying. A sync lock 60 formed in accordance with the invention is shown schematically in FIGS. 3 and 4 and is described in detail below. FIG. 2 is a system schematic diagram showing the synchronization shaft locks and how they are coupled to the overall hydraulic thrust reverser actuation system. Prior to describing these FIGURES, a brief description of the operation of the thrust reverser shown in FIG. 1 is set forth.

When the thrust reversers are to be deployed, as described more fully below, a signal is first sent to the synchronization shaft lock system that causes the sync lock control valve 50 to unlock the sync locks 60. Signals are then sent to the thrust reverser actuator system, which ultimately causes hydraulic fluid pressure to extend the actuator rods 20. Extension of the actuator rods 20 translates the sleeves 11 from a stowed position (shown in FIG. 1) in the aft direction (shown by an arrow 13) to a deployed position (not shown). In this process, the cascade vanes are uncovered. Movement of the sleeves 11 aft also causes the blocker doors 9 to pivot from their stowed position to their deployed position. In the deployed position, the blocker doors 9 lie in the annular duct 15 transverse to the normal airflow path, thereby blocking rearward movement of the air through the annular duct 15. In this manner, rearward movement of the engine fan air is redirected outward, through the cascade vanes. The vanes are slanted in a forward direction. Thus, during thrust reverser operation, fan air from the engine is redirected forwardly through the vanes to aid in stopping the airplane.

When the thrust reversers are to be stowed, a signal is sent to the thrust reverser actuation system commanding it to cause the actuator rods 19 to retract. This causes a corresponding translation of the sleeves 11 in the forward direction, eventually coveting the cascade vanes. Likewise, the blocker doors 9 return to their stowed position, allowing fan air to flow aft along its normal path through the annular duct 15. Another signal is sent to the synchronization shaft lock that causes the sync lock control valve 50 to release pressure in the sync locks 60, allowing the sync locks to return to their locked state. Thrust reversion is complete.

FIG. 2 is a system schematic of a typical hydraulic thrust reverser actuation and control system embodying a synchronization shaft lock system formed in accordance with this invention. The thrust reverser actuation systems comprise an isolation valve 45, a directional control valve 47, the plurality of actuators 19, the pair of synchronization systems 5, a hydraulic fluid supply line 35, a return line 37, a deploy pressure line 39, and a stow pressure line 41. The synchronization shaft lock system comprises the sync lock control valve 50, the two sync locks 60, and a sync lock unlock pressure line 43.

The isolation valve 45 is connected to the supply line 35 and the return line 37. The isolation valve 45 receives a control signal from the flight deck when the thrust reversers are to be moved. The control signals referred to herein typically come from some kind of an electronic engine control system. For purposes of the present invention, the signal can come from any source as long as it is considered a valid control signal by design.

Upon receipt of a control signal, the isolation valve 45 activates, allowing hydraulic fluid pressure from the supply line 35 to enter the thrust reverser actuation system, and in particular, the directional control valve 47. The isolation valve 45 is constructed such that the return line 37 is always in hydraulic communication with the thrust reverser actuation system, regardless of whether the isolation valve is activated. This connection allows hydraulic fluid pressure from the thrust reverser actuation system to be continuously relieved as appropriate, thus, preventing any unwanted pressure buildup.

When the isolation valve 45 is activated to allow hydraulic fluid pressure to enter the actuation system, the position of the directional control valve 47 determines whether the hydraulic fluid pressure is used to deploy the thrust reversers or to stow the thrust reversers. The position of the directional control valve 47 is determined by a separate control signal sent from the flight deck. The directional control valve 47 directs hydraulic fluid pressure through the deploy pressure line 39 and the stow pressure line 41 to the actuators 19 in such a way as to cause each actuator piston to see a force difference between its sides. As can be seen from FIG. 2, the deploy pressure line 39 is branched to connect to each of the actuators 19 via the synchronization shafts 5, and the stow pressure line 41 is connected to each of the actuators 19 individually.

In a preferred embodiment, the directional control valve 47 accomplishes actuator piston movement using two basic operative positions. In the first position, the directional control valve 47 connects the supply line 35 to the deploy pressure line 39, and the return line 37 to the stow pressure line 39. Because the deploy pressure line is connected to the deploy compartments of the actuators 19, this position allows supply line hydraulic fluid pressure to cause a force increase on the deploy side of the piston, thus causing it to extend the thrust reverser sleeves 11. In the second position, the directional control valve 47 connects the supply line 35 to the stow pressure line 39 and the return line 37 to the deploy pressure line 41. Because the stow pressure line is connected to the stow compartments of the actuators 19, this position allows supply line hydraulic fluid pressure to cause a force increase on the stow side of the piston, thus causing it to retract the thrust reverser sleeves 11.

Of course, other embodiments of the isolation valve 45, the directional control valve 47, and the application of hydraulic fluid pressure to the actuators are possible. For example, a recirculation scheme could be used to increase the efficiency of the thrust reverser control system, therefore requiring less hydraulic pressure from the hydraulic fluid supply line. Such systems would not affect the performance or objects of this invention. The important function of the isolation valve and the directional control valve being to cause a force difference between the sides of the piston in order to urge the piston in one direction or the other.

As noted above, the synchronization shaft lock system of the present invention comprises the sync lock control valve 50 and two sync locks 60. The sync lock control valve 50 is connected to the supply line 35, the return line 37, and the sync lock unlock pressure line 43. The sync lock unlock pressure line 43 is then branched to connect to both of the sync locks 60. The function of the sync lock control valve 50 is to regulate the hydraulic fluid pressure in the sync lock unlock pressure line 43. The sync lock control valve also has two basic operative positions. In the first position, the sync lock control valve 50 connects the sync lock unlock pressure line 43 to the supply line 35. The sync lock control valve includes mechanisms for receiving an independent control signal from the flight deck commanding the sync lock control valve 50 to activate. When activated, hydraulic fluid pressure from the supply line 35 causes the sync locks 60 to unlock in the manner described below.

When not activated, the sync lock control valve 50 assumes an inoperative position, connecting the sync lock unlock pressure line 43 to the return line 37. This allows the sync locks 60 to revert to their normal locked position, as will be described below. The sync lock control valve 50 preferably is a standard electrohydraulic solenoid capable of singularly controlling the communication of hydraulic fluid between the supply and return lines 35, 37, and the sync lock unlock pressure line 43. The sync lock control valve 50 may be located close to the sync locks 60 or may be remotely located, as desired.

As noted above, and shown in FIG. 2, the synchronization shaft system 5 includes an internal flexible shaft 7 and a surrounding outer conduit or tube 6. Hydraulic fluid from the deploy pressure line 39 fills the conduit or tube 6. The sync conduit 6 is attached to each of the actuators 20 such that hydraulic fluid pressure from the deploy pressure line 39 is in communication with the actuators 19. As described above, the flexible shaft 7 is coupled to the actuator rods 20 in a manner that maintains synchronization between the rods as they are extended and retracted. When the sync lock 60 is locked, it prohibits the flexible shaft 7 from rotating, thereby prohibiting the actuator rods 20 and sleeves 11 from translating and the thrust reverser from deploying. The operation of the sync locks 60 are described below in detail.

Overall, the timing of the thrust reverser control system in operation is as follows. Starting in a normal stowed state, a command given by the flight deck to initiate reverse thrust causes a first control signal to be sent to the sync lock control valve 50. In response, the sync lock control valve 50 goes to its activated position, connecting the supply line 35 to the sync lock unlock pressure line 43. Hydraulic fluid pressure in the sync lock unlock pressure line 43 causes the sync locks 60 to unlock as described below. Next, a second control signal causes the directional control valve 47, to position itself so that entering hydraulic fluid from the supply line 35 will flow to the deploy pressure line 39 and exiting hydraulic fluid pressure from the stow pressure line 41 will flow to the return line 37. A third control signal activates the isolation valve 45 causing it to allow hydraulic fluid pressure from the supply line 35 to enter the directional control valve 47, which, in turn directs hydraulic fluid pressure into the deploy pressure line 39.

Hydraulic fluid pressure in the deploy pressure line 39 passes through the sync conduit 6 to the deploy-side compartments of each actuator 19. The actuators 19 respond by extending their rods aft. As noted above, the actuator rods 20 are connected to the flexible shaft 7 of the synchronization shaft 5 such that translating movement of any single actuator rod 20 causes a rotation of the flexible shaft 7. In this way, all actuator rods 20 are caused to move at the same time and the same rate. The movement of the actuator pistons forces hydraulic fluid pressure in the stow-side compartments of the actuators into the stow pressure line 41 and then to the return line 37. The aft translation of the actuator rods 20 causes the thrust reverser sleeves 11 to move aft, causing the production of reverse thrust, as described above.

When a command to stow the thrust reversers is initiated at the flight deck, a control signal first causes the directional control valve 47 to position itself so that entering hydraulic fluid pressure from the supply line 35 flows to the stow pressure line 41, and exiting hydraulic fluid pressure from the deploy pressure line 39 flows to the return line 37. Hydraulic fluid pressure in the stow pressure line 41 is applied to the stow-side compartments of each actuator 19. The actuators 19 respond by retracting their rods 20 forward. As before, retraction is synchronized by the coupling provided via the synchronization shafts 5. The movement of the actuator pistons forces the hydraulic fluid pressure in the deploy-side compartments of the actuators 19 into the sync conduits 6 and deploy pressure line 39, and then to the return line 37. The forward translation of the actuator rods 20 causes the thrust reverser sleeves 11 to move forward, ending reverse thrust as described above.

Next, a separate control signal causes the sync lock control valve to connect the sync lock unlock pressure line 43 with the return line 37, thus draining the sync lock unlock pressure line 43 and allowing the sync locks 60 to return to their locked position, as described below. Lastly, another control signal causes the isolation valve 45 to deactivate, stopping hydraulic fluid pressure from the supply line 35 from entering the control system and the directional control valve 47.

Figure 3:
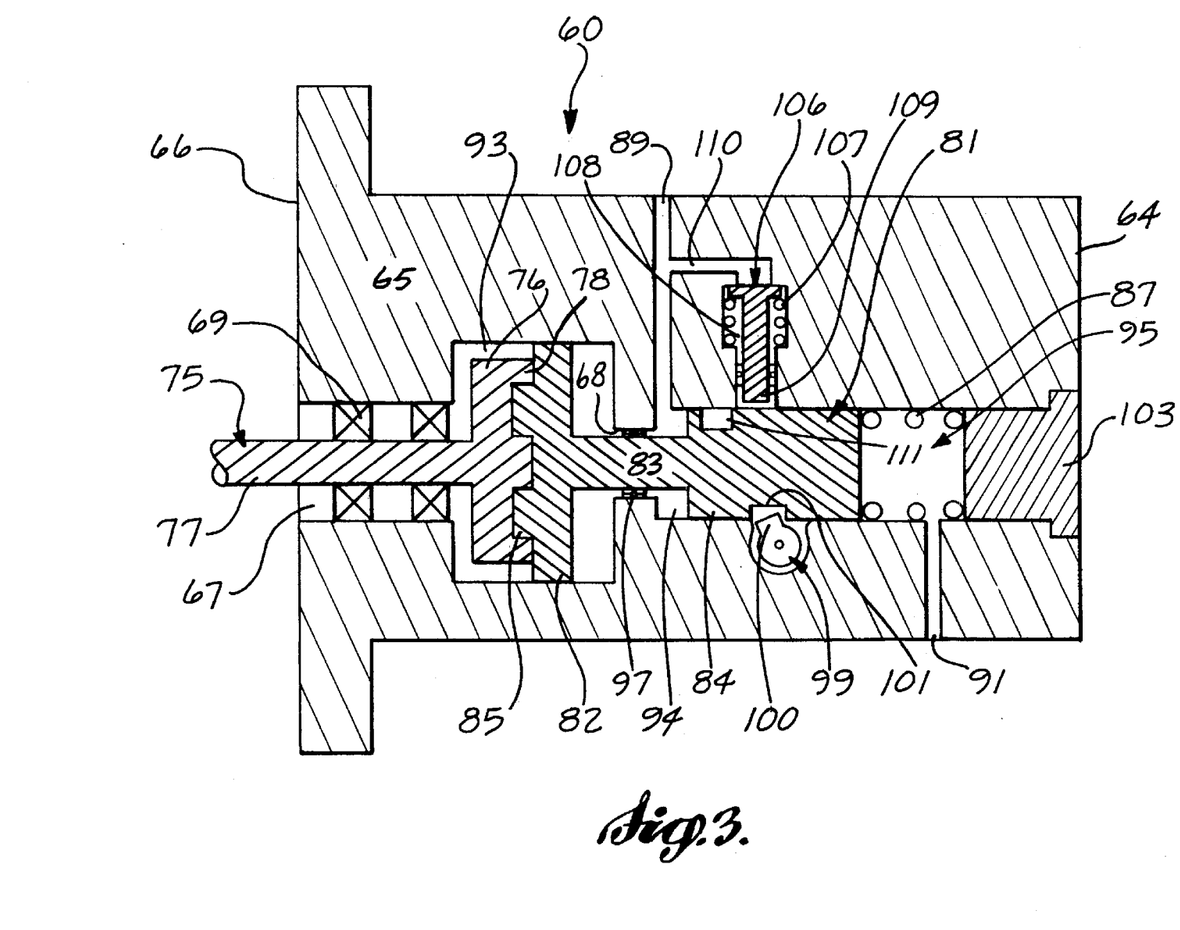
FIG. 3 is a cross-sectional schematic view of the presently preferred embodiment of a sync lock formed in accordance with the invention shown in its locked state.
Figure 4:
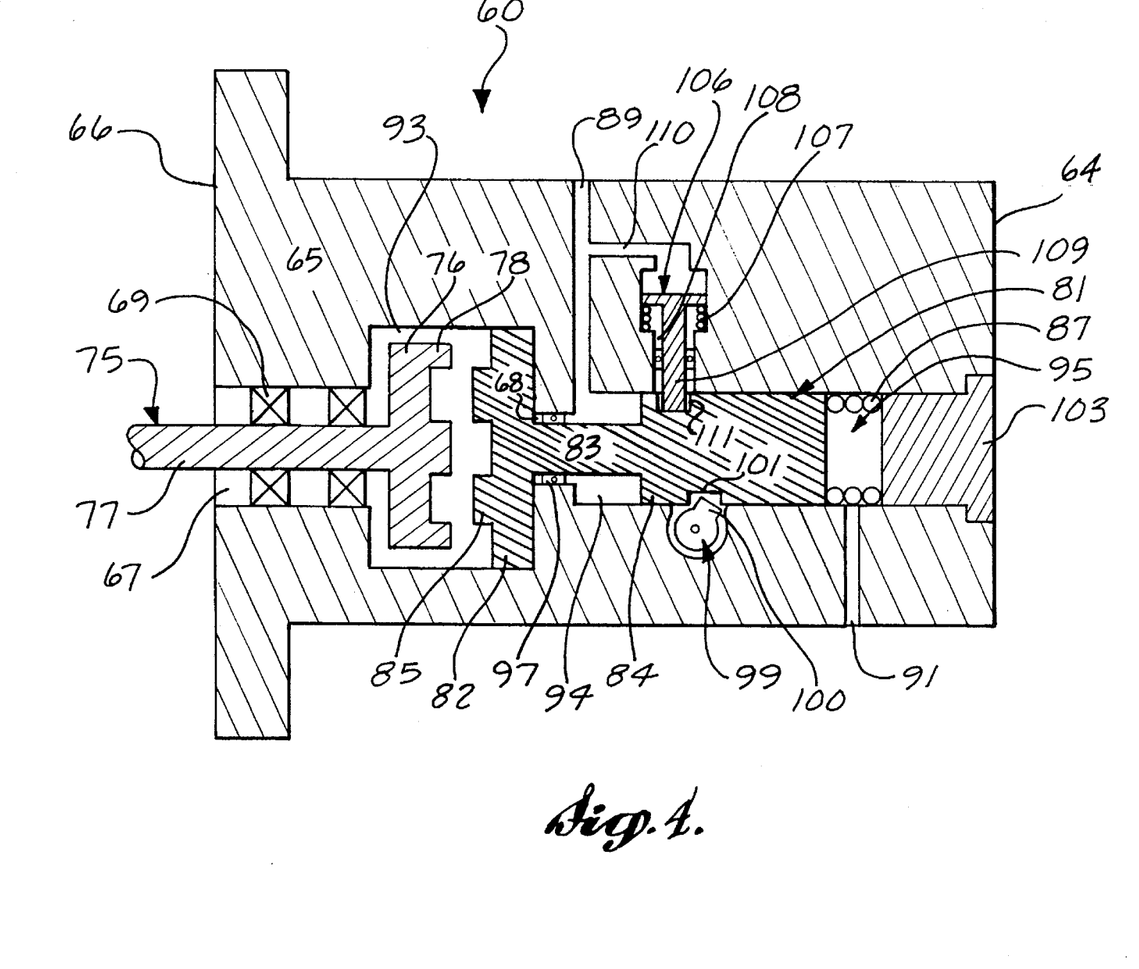
FIG. 4 is a cross-sectional schematic view of the presently preferred embodiment of a sync lock formed in accordance with the invention shown in its unlocked state.

FIGS. 3 and 4 are cross-sectional schematic views of the presently preferred embodiment of the sync locks 60 formed in accordance with the present invention. The sync lock 60 shown in FIG. 3 is in its locked position and in FIG. 4 in its unlocked position. The sync lock 60 includes the housing 65, the rotating jaw 75, a sliding jaw 81, a lock spring 87, a deploy pressure port 91, an unlock pressure port 89, an unlock latch 106, a plurality of seals 97, a manual release mechanism 99, and various chambers and passages. All of the components of the sync lock 60 are formed of materials known to those skilled in the art of mechanical systems design. The overall dimensions of the sync lock 60 are not distinct and will depend upon various factors known to those skilled in the hydraulic actuation art, e.g., the amount of hydraulic pressure to be applied to the lock components.

Figure 5:
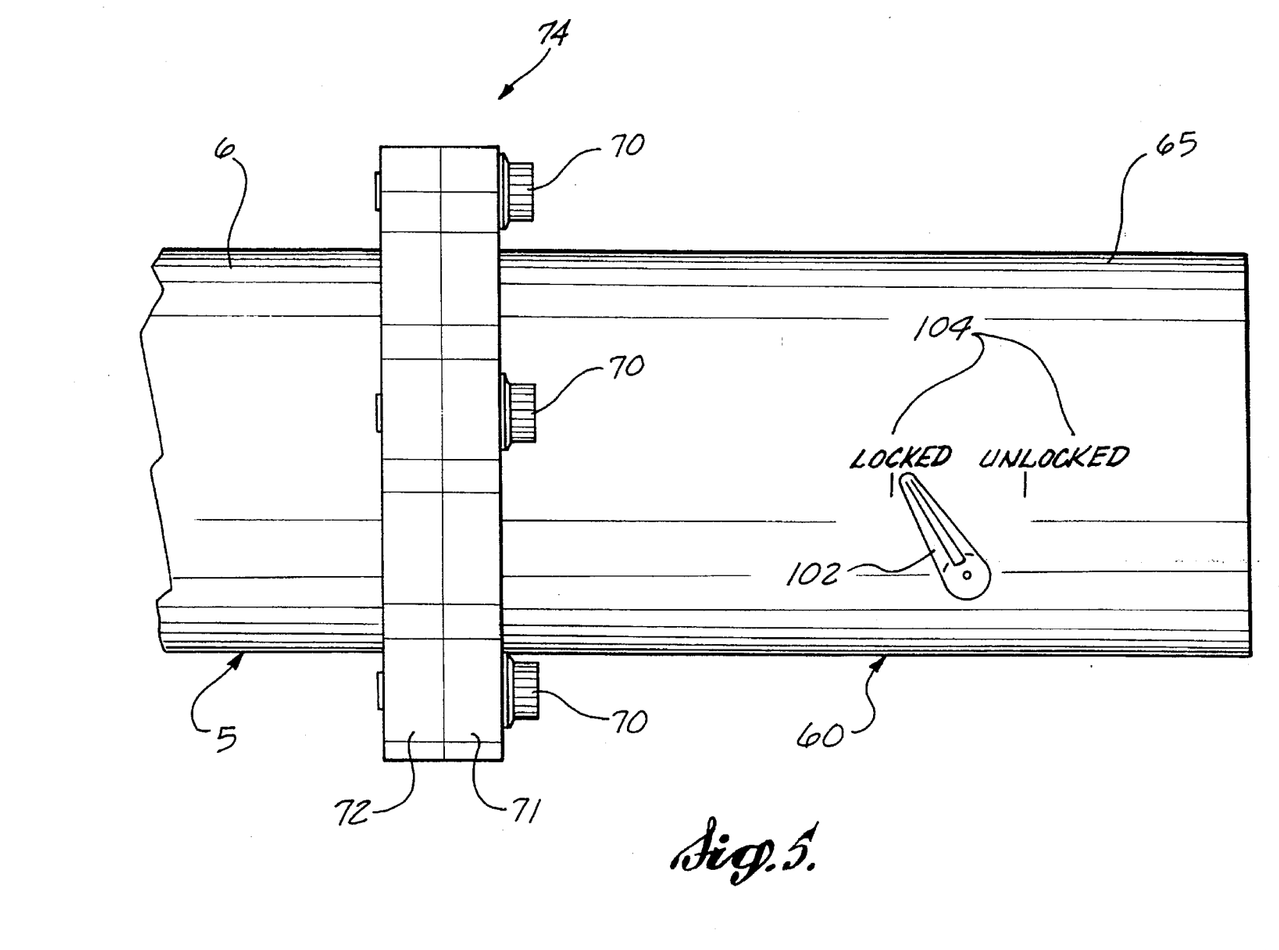
FIG. 5 is a side view of the sync lock shown in FIGS. 3 and 4, attached to the end of a synchronization shaft conduit or tube.

The sync lock housing 65 is generally cylindrical in shape and has internal chambers described below. A connector rigidly attaches one end 66 of the housing 65 of the sync lock 60 to the outer conduit or tube 6 of the synchronization system 5. See FIG. 5. The novelty of the present invention does not reside in this connection. Any connection selected must at least be capable of keeping the sync lock housing 65 securely attached to the conduit 6 during hydraulic loading and must minimize hydraulic fluid leakage therefrom. Some typical connectors are a bolt-nut attachment arrangement, a screw attachment arrangement, and a clamp fastener arrangement. The presently preferred connector is shown in FIG. 5 and comprises a five-bolt attachment arrangement 74 where the bolts 70 are inserted radially from, and parallel to, the longitudinal axis of the sync lock 60 through a flange 71 located at one end 66 of the housing 65. The bolts 70 rigidly attach the sync lock 60 to a flange 72 that forms part of, or is rigidly attached to, the end of the conduit 6.

Located at the connection end 66 of the housing 65 is an opening that continues part way into the housing 65 to define a first drive passage 67. Hydraulic fluid from the deploy pressure line 39 enters the sync lock housing 65 via the first drive passage 67. The first drive passage 67 ends at a jaw chamber 93, which is connected to one end 94 of a piston chamber 95 via a second drive passage 68. The jaw chamber 93, second drive passage 68, and piston chamber 95 are all formed in the housing 65. In the preferred embodiment, the piston chamber 95 is machined inward from the other end 64 of the housing 65. An end cap 103 closes off the piston chamber 95 opening. The end cap 103 may be threaded into, and would thus be removable from, the housing 65. When attached to the housing 65, the end cap must be capable of withstanding the loads in the piston chamber 95 while remaining securely attached to the housing 65.

The rotating jaw 75 comprises a rotor 76 and a shaft 77. The rotor 76 is a gear, or shallow cylinder, with rotor teeth 78 on one of its circular faces. The shaft 77 is permanently connected to the rotor 76, extending normal to the plane of the rotor 76 on the face opposite the rotor face having rotor teeth 78. The rotating jaw 75 is positioned within the housing 65 such that the rotor 76 is in the jaw chamber 93 and the shaft 77 extends outwardly, through the first drive passage 67. The longitudinal axis of the rotating jaw 75 is generally oriented parallel to the longitudinal axis of the first drive passage 67. The rotating jaw 75 is capable of rotation only, according to the presently preferred embodiment. The other end of the rotating jaw shaft 77 is connected to the flexible shaft 7 of the synchronization shaft system 5. The preferred connection (not shown) is such that the rotating jaw shaft 77 is a square drive attachable to a broach-cut square on the end of the flexible shaft 7.

Surrounding and supporting the shaft 77 in the first drive passage are one or more bearings 69. These bearings 69 support the shaft 77 in a manner that allows the shaft 77 to rotate about its longitudinal axis. The beatings 69 are not novel and may include typical bearing components, i.e., an inner race, an outer race, and a ball bearing. The bearings 69 are capable of allowing hydraulic fluid to pass through them from the drive passage into the jaw chamber 93.

The sliding jaw 81 comprises a stator 82, a sliding drive rod 83, and a piston 84. The stator 82 is also a gear, or shallow cylinder, with stator teeth 85 on one of its circular faces. The stator teeth 85 match the rotor teeth 78 and allow the stator 82 to be engageable to the rotor 76. One end of the sliding drive rod 83 is permanently connected to the stator 82, and extends normal to the unengaged face of the stator 82. The other end of the sliding drive rod 83 is permanently connected to the piston 84. The piston 84 is generally a cylinder sized to match the diameter of the piston chamber 95. The sliding jaw 81 is positioned within the housing 65 such that the stator 82 is in the jaw chamber 93; the sliding drive rod 83 extends from the jaw chamber 93, through the second drive passage 68, into the piston chamber 95; and the piston 84 is in the piston chamber 95. The sliding jaw 81 is capable of translation along its longitudinal axis.

A lock spring 87, positioned entirely within the piston chamber 95, is located between the unattached face of the piston 84 and the end cap 103. The lock spring 87 is always in compression within the piston chamber 95, continually urging the sliding jaw 81 toward the rotating jaw 75.

Further shown in FIG. 3 a deploy pressure port 91 connects the piston chamber 95 to the deploy pressure line 39 via a hydraulic passage 52 (shown in FIG. 2). In the presently preferred embodiment, the hydraulic passage 52 connects the deploy pressure port 91 to the outer tube or conduit 6 of the synchronization shaft system 5, which is itself connected to the deploy pressure line 39 as described above. Therefore, hydraulic fluid pressure flows from the deploy pressure line 39 through the sync conduit 6 into the sync lock first drive passage 67 and into the portion of the piston chamber 95 containing the lock spring 87 via the deploy pressure port 91.

An unlock pressure port 89 is connected to the sync lock unlock pressure line 43 (shown in FIG. 2). The unlock pressure port 89 provides a passageway for hydraulic fluid pressure from the sync lock unlock pressure line 43 to enter the portion of the piston chamber 94 on the side of the piston 84 remote from the lock spring 87.

FIG. 3 further shows an unlock latch 106 for latching the sliding jaw 81 in its unlocked position. In the preferred embodiment, the unlock latch 106 is a simple spring-loaded pin 109 located transverse to the longitudinal axis of the piston 84 in a latch hole 107 extending radially out from the piston chamber 95 relative to the longitudinal axis of the piston 84. The latch hole 108 is connected through a duct 110 to the deploy pressure port 89. A small spring 107 wrapped around the pin 108 is configured within the latch hole 108 such that the small spring 107 continuously urges the pin 109 away from the piston chamber 95. A latch notch 111 capable of accepting the pin 109 when the piston 84 is in its unlocked state is formed in the piston 84. The pin 109 and latch notch 111 are positioned relative to each other such that, when the pin 109 is forced into the latch notch 11, the sliding jaw 81 is disengaged from the rotating jaw 75.

The sliding jaw 81, in the preferred embodiment, includes a plurality of seals 97 located at various points about the periphery of the sliding jaw 81 (only one of which is shown surrounding the sliding drive rod 83) for prohibiting selected hydraulic fluid pressure exchange between various chambers.

A manual release mechanism 99 allows the sliding jaw 81 to be mechanically forced into its unlocked position. The manual release mechanism 99 is useful during maintenance of the thrust reversers because it allows the mechanic to unlock the sync lock 60 without having to use the thrust reverser control system. The release mechanism 99 is located in the housing 65 at the piston chamber 95 next to the piston 84 and comprises a rotating tooth 100. An outer lever 102 (shown in FIG. 5) located outside of the housing 65 is mounted on the same shaft as the rotating tooth 100 to allow a mechanic to rotate the tooth 100. The piston 84 includes a slide notch 101 in its periphery, sized to accept the rotating tooth 100. The rotating tooth 100 is oriented so that, when the outer lever is rotated, the rotating tooth 100 forces the slide notch 101, piston 84, and sliding jaw 81 to slide away from the rotating jaw 75. In this manner the rotating jaw 75 and sliding jaw 81 are uncoupled. The reverse movement of the outer lever causes the sliding jaw 81 to slide toward the rotating jaw 75, coupling the jaw connection. An indicator (shown in FIG. 5) located on the outside of the housing provides an indication of the position of the rotating notch 100. In addition to the simple on/off indicia located on the side of the outer lever shown in FIG. 5, the indicator may also include something more elaborate, such as an electrical signal sent to a flight deck display.

Operation of the lock is accomplished as follows. Starting in a normal stowed state, a command given by the flight deck to initiate reverse thrust first causes a control signal to be sent to the sync lock control valve 50. In response, the sync lock control valve 50 connects the supply line 35 to the sync lock unlock pressure line 43. Hydraulic fluid pressure in the sync lock unlock pressure line 43 enters the housing 65 through the unlock pressure port 89. The hydraulic fluid pressure enters the piston chamber 95 at the connection of the piston 84 to the sliding drive rod 83 and urges the piston 84 against the lock spring 87. The hydraulic fluid pressure also travels along the duct 110, quickly overcoming the compressive force of the small spring 107 and pushing the pin 109 along the latch hole 108, into the piston chamber 95, and against the piston 84. The pressure builds upon the piston 84 until the force is sufficient to overcome the compressive force of the lock spring 87 acting on the opposite face of the piston 84. Once a sufficient pressure builds on the piston face, the sliding jaw 81 is forced back, compressing the lock spring 87 further, and causing the pin 109 to move into the latch notch 111. In this way the sliding jaw 81 is latched away from the rotating jaw 75 and the sync lock 60 is unlocked as shown in FIG. 4. Since the sliding jaw 81 is no longer engaging the rotating jaw 75, the rotating jaw 75 is free to rotate, hence the flexible shaft 7 is also free to rotate. The remaining operation of thrust reverser deployment is described above.

As noted above, during thrust reverser deployment, the thrust reverser control system causes hydraulic fluid pressure from the supply line 35 to enter the deploy pressure line 39, which eventually enters the deploy pressure port 91 and the piston chamber 95 to reach the face of the piston 84 in the portion of the piston chamber 95 containing the lock spring 87. The hydraulic fluid pressure applied to the piston 84 in the piston chamber 95 counteracts the hydraulic fluid pressure applied to the opposite face of the piston through the sync lock unlock pressure line 43. As a result, no extreme pressure difference that might shear the pin 109 occurs across the piston 84.

When a command to stow the thrust reversers is initiated in the flight deck, the thrust reversers are stowed as described above. Once in their stowed position, the sync lock control valve 50 connects the sync lock unlock pressure line 43 to the return line 37. Hydraulic fluid pressure, in the first end 94 of the piston chamber 95 and in the duct 110, drains out of the unlock pressure port 89, through the sync lock unlock pressure line 43, and into the return line 37. The reduction in pressure allows the small spring 107 to force the pin 109 out of the latch notch 111, away from the piston 84, and up the latch hole 108. Because the thrust reverser control system has already connected the deploy pressure line 39 to the return line 37, there is no hydraulic pressure difference seen between the faces of the piston 84. With the unlock latch 106 undone, the lock spring 87 forces the sliding jaw 81 against the rotating jaw 75. The sync lock 60 is now returned to its normal locked position, prohibiting rotation of the rotating jaw 75.

As can be appreciated from the foregoing description, a synchronization shaft lock formed in accordance with this invention will remain locked even if an inadvertent decrease in the pressure in the stow-side compartment of the actuators 19 occurs, because the sync lock itself is not connected to, or dependent upon, the pressure in the stow-side compartment of the actuators 19. Likewise, a synchronization shaft lock formed in accordance with this invention will remain locked even if an inadvertent increase in the deploy-side compartment of the actuators 19 occurs, because any hydraulic fluid pressure increase in the deploy pressure line 39 will be seen upon both sides of the sliding jaw 81 (i.e., at the stator 82 and at the unattached face of the piston 84) and, hence, will have no net affect on the position of the sliding jaw.

While the preferred embodiment of the invention has been illustrated and described, it will be appreciated that within the scope of the appended claims various changes can be made therein without departing from the spirit and scope of the invention.

The embodiments of the invention in which an exclusive property or privilege is claimed are defined as follows:

1. A thrust reverser synchronization shaft lock system for a jet engine hydraulic thrust reverser synchronization shaft, the synchronization shaft lock system comprising:

(a) a signal-controllable sync lock control valve having an input port a return port and a output port, the input port being suitable for connection to a supply line and the return port being connected to a return line; and (b) a sync lock connected to the output port of the sync lock control valve and connected to a synchronization shaft of a jet engine thrust reverser for prohibiting the synchronization shaft from rotating, the sync lock including:

(i) a rotating jaw including a cylindrical rotor having teeth on one of its circular faces and a shaft extending outwardly from the other cylindrical face, the shaft being coupled to the synchronization shaft;

(ii) a sliding jaw including a stator having teeth on one end for engaging the teeth on the rotating jaw, the sliding jaw also including a sliding drive rod and a piston, the sliding drive rod attached at one end to the stator and at the other end to the piston;

(iii) a lock spring for applying a force to the piston to urge the teeth of the sliding jaw into engagement with the teeth of the rotating jaw; and (iv) a conduit for coupling the output port of the sync lock control valve to the piston such that hydraulic pressure in the conduit creates a force that urges the teeth of the sliding jaw out of engagement with the teeth of the rotating jaw.

2. A thrust reverser synchronization shaft lock system according to claim 1, wherein the sync lock control valve is located remote from the sync lock.

3. A thrust reverser synchronization shaft lock system according to claim 1, wherein the sync lock control valve is a single electrohydraulic solenoid valve.

4. A thrust reverser synchronization shaft lock system according to claim 1, wherein the sync lock further includes:

(a) a generally cylindrical housing including a first drive passage, a jaw chamber, a second drive passage, and a piston chamber; the rotating jaw being positioned within the housing such that the shaft is in the first drive chamber and extends partly into the jaw chamber and the rotor is in the jaw chamber; the sliding jaw being positioned within the housing such that the stator is in the jaw chamber, the sliding drive rod extends from the jaw chamber through the second drive passage and into the piston chamber, and the piston is in the piston chamber;

(b) a connector for connecting the housing to the synchronization shaft of a jet engine hydraulic thrust reverser; and (c) an unlock latch for maintaining the sync lock in an unlocked position when hydraulic fluid pressure from the output port of the sync lock control valve enters the piston chamber and the lock spring is further depressed.

5. A thrust reverser synchronization lock system according to claim 4, wherein the sync lock further includes bearings positioned in the first drive chamber around the shaft for supporting the rotating jaw.

6. A thrust reverser synchronization shaft lock system according to claim 4, further including a plurality of seals selectively positioned about the periphery of the sliding jaw.

7. A thrust reverser synchronization shaft lock system according to claim 4, further including a manual release mechanism for manually translating the piston against the force of the lock spring to depress the lock spring and disengage the rotor teeth from the stator teeth.

8. A thrust reverser synchronization shaft lock system according to claim 4, further including an indicator for indicating whether the sync lock is in the locked position or the unlocked position.

9. A thrust reverser synchronization shaft lock system according to claim 4, wherein the sync lock connector includes a nut-and-bolt attachment arrangement for connecting the synchronization shaft to the housing.

10. A sync lock for a jet engine hydraulic thrust reverser synchronization shaft lock, the sync lock comprising:

(a) a generally cylindrical housing including a first drive passage, a jaw chamber, a second drive passage, and a piston chamber;

(b) a connector for connecting the housing to the synchronization shaft of a jet engine hydraulic thrust reverser;

(c) a rotating jaw including a cylindrical rotor and a shaft, the rotor having rotor teeth on one of its circular faces, the shaft being affixed to the rotor and extending normal to the rotor opposite the circular face having rotor teeth, and the rotating jaw being positioned within the housing such that the shaft is in the first drive chamber and extends partly into the jaw chamber and the rotor is in the jaw chamber;

(d) a sliding jaw including a cylindrical stator, a sliding drive rod, and a piston, the stator having stator teeth on one of its circular faces suitable for engaging with the rotor teeth, one end of the sliding drive rod affixed to the stator and extending normal to the stator opposite the cylindrical face having stator teeth, the other end of the sliding drive rod affixed to one end of the piston, and the sliding jaw being positioned within the housing such that the stator is in the jaw chamber, the sliding drive rod extends from the jaw chamber through the second drive passage and into the piston chamber, and the piston is in the piston chamber;

(e) a compressed lock spring mounted in the piston chamber on one side of the piston for creating a force pressing the sliding jaw in the direction of the rotating jaw;

(f) an unlock pressure port extending through the housing to the portion of the piston chamber on the side of the piston opposite the lock spring, the unlock pressure port being suitable for allowing hydraulic fluid pressure to enter the piston chamber and force the sliding jaw to compress the lock spring further causing an uncoupling of the rotor teeth and the stator teeth; and (g) an unlock latch for maintaining the sync lock in an unlocked position when hydraulic fluid pressure from the unlock pressure port enters the piston chamber and the lock spring is further depressed.

11. A sync lock according to claim 10, wherein the sync lock further includes bearings positioned in the first drive chamber around the shaft for supporting the rotating jaw.

12. A sync lock according to claim 10, further including a plurality of seals selectively positioned about the periphery of the sliding jaw.

13. A sync lock according to claim 10, further including a manual release mechanism for manually translating the piston against the force of the lock spring to depress the lock spring and disengage the rotor teeth from the stator teeth.

14. A sync lock according to claim 10, further including an indicator for indicating whether the sync lock is in the locked position or the unlocked position.

15. A sync lock according to claim 10, wherein the connector includes a nut-and-bolt attachment arrangement for connecting the synchronization shaft to the housing.

* * * * *

UNITED STATES PATENT AND TRADEMARK OFFICE
CERTIFICATE OF CORRECTION

PATENT NO. : 5,609,020
DATED : March 11, 1997
INVENTOR(S) : J. Jackson et al.

It is certified that error appears in the above-indentified patent and that said Letters Patent is hereby corrected as shown below:

| COLUMN | LINE |  |
|---|---|---|
| 12 (Claim 1, | 21 line 5) | "input port a return port and a output port," should read --input port, a return port and an output port,-- |
| 12 (Claim 1, | 22 line 6) | "being suitable for connection" should read --being connected-- |

Signed and Sealed this

Twenty-ninth Day of July, 1997

Attest:

BRUCE LEHMAN

*Attesting Officer*     *Commissioner of Patents and Trademarks*

UNITED STATES PATENT AND TRADEMARK OFFICE
Certificate

Patent No. 5,609,020                                    Patented: March 11, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: John Jackson; Mark J. Gucker; Mark H. Smith; Michael E. Renzelmann; Joseph Kopecek; and Henry Fong.

Signed and Sealed this Eighth Day of February, 2000.

TIMOTHY S. THORPE
*Supervisory Patent Examiner*
Art Unit 3746